US006043575A

United States Patent [19]
Ghode et al.

[11] Patent Number: 6,043,575
[45] Date of Patent: Mar. 28, 2000

[54] POWER TOOL WITH AIR DEFLECTOR FOR VENTING MOTOR EXHAUST AIR

[75] Inventors: Anil P. Ghode, Libertyville, Ill.; Martin S. Scolaro, Racine; Raymond D. DeRome, Twin Lakes, both of Wis.

[73] Assignee: Snap-on Tools Company, Kenosha, Wis.

[21] Appl. No.: 09/263,992

[22] Filed: Mar. 5, 1999

[51] Int. Cl.[7] .................................................. H02K 9/00
[52] U.S. Cl. ................. 310/52; 310/47; 310/42; 310/50; 310/59; 310/65; 310/89; 310/91; 310/60 A
[58] Field of Search .................. 310/52, 47, 42, 310/50, 59, 65, 89, 91, 60 A

[56] References Cited

U.S. PATENT DOCUMENTS

| | | |
|---|---|---|
| 1,828,903 | 10/1931 | Moretti . |
| 2,212,342 | 8/1940 | Forss .......................................... 172/36 |
| 3,344,291 | 9/1967 | Pratt ........................................... 310/50 |
| 3,456,696 | 7/1969 | Gregory et al. . |
| 3,476,960 | 11/1969 | Rees . |
| 3,575,524 | 4/1971 | Adajian ..................................... 415/213 |
| 3,652,879 | 3/1972 | Plunkett et al. ........................... 310/50 |
| 3,824,684 | 7/1974 | Wheeler . |
| 3,829,722 | 8/1974 | Rosenthal, Jr. et al. . |
| 3,845,336 | 10/1974 | Moores, Jr. et al. . |
| 3,903,440 | 9/1975 | Paule et al. ................................ 310/50 |
| 4,150,313 | 4/1979 | Panza ......................................... 310/51 |
| 4,314,170 | 2/1982 | Sahrbacker . |
| 4,342,929 | 8/1982 | Horne . |
| 4,385,276 | 5/1983 | Bitzel . |
| 4,623,810 | 11/1986 | Smith . |
| 4,730,134 | 3/1988 | Sistare ....................................... 310/50 |
| 5,006,740 | 4/1991 | Palm . |
| 5,084,642 | 1/1992 | Katsuzawa et al. ....................... 310/54 |
| 5,089,729 | 2/1992 | Moores ...................................... 310/50 |
| 5,136,197 | 8/1992 | Hallett ....................................... 310/83 |
| 5,273,358 | 12/1993 | Byrne et al. ............................. 336/205 |
| 5,317,224 | 5/1994 | Ragaly ...................................... 310/58 |
| 5,343,101 | 8/1994 | Matani ...................................... 310/58 |
| 5,614,774 | 3/1997 | McCallops et al. ...................... 310/58 |
| 5,698,914 | 12/1997 | Shiga et al. ........................... 310/60 A |
| 5,747,900 | 5/1998 | Nakamura et al. ....................... 310/58 |

OTHER PUBLICATIONS

Photos and copy of packaging of DeWalt DW991K–2 Heavy Duty Cordless Drill, sold prior to Mar. 1998.

*Primary Examiner*—Nestor Ramirez
*Assistant Examiner*—Thanh Lam
*Attorney, Agent, or Firm*—Emrich & Dithmar

[57] ABSTRACT

A power tool is provided and includes a tool housing having interior and exterior surfaces and inlet and outlet air vents and a motor disposed in the tool housing and having a motor housing with an external surface and inlet air ports for the passage of cooling air into the motor and outlet air ports for passage of warmed exhaust air from the motor. The inlet and outlet air ports open at the external surface and the outlet air ports are spaced from the inlet air ports. The tool also includes an air deflector resiliently coupled to the external surface. The air deflector includes wall structures bracketing the outlet air ports. The structures have portions extending to and contacting the interior surface of the tool housing and bracketing the outlet air vents to form a barrier around the outlet air ports and vents to channel exhaust air to the outlet vents and substantially inhibit exhaust air from the outlet air ports from entering the inlet air ports or other portions of the tool.

20 Claims, 4 Drawing Sheets

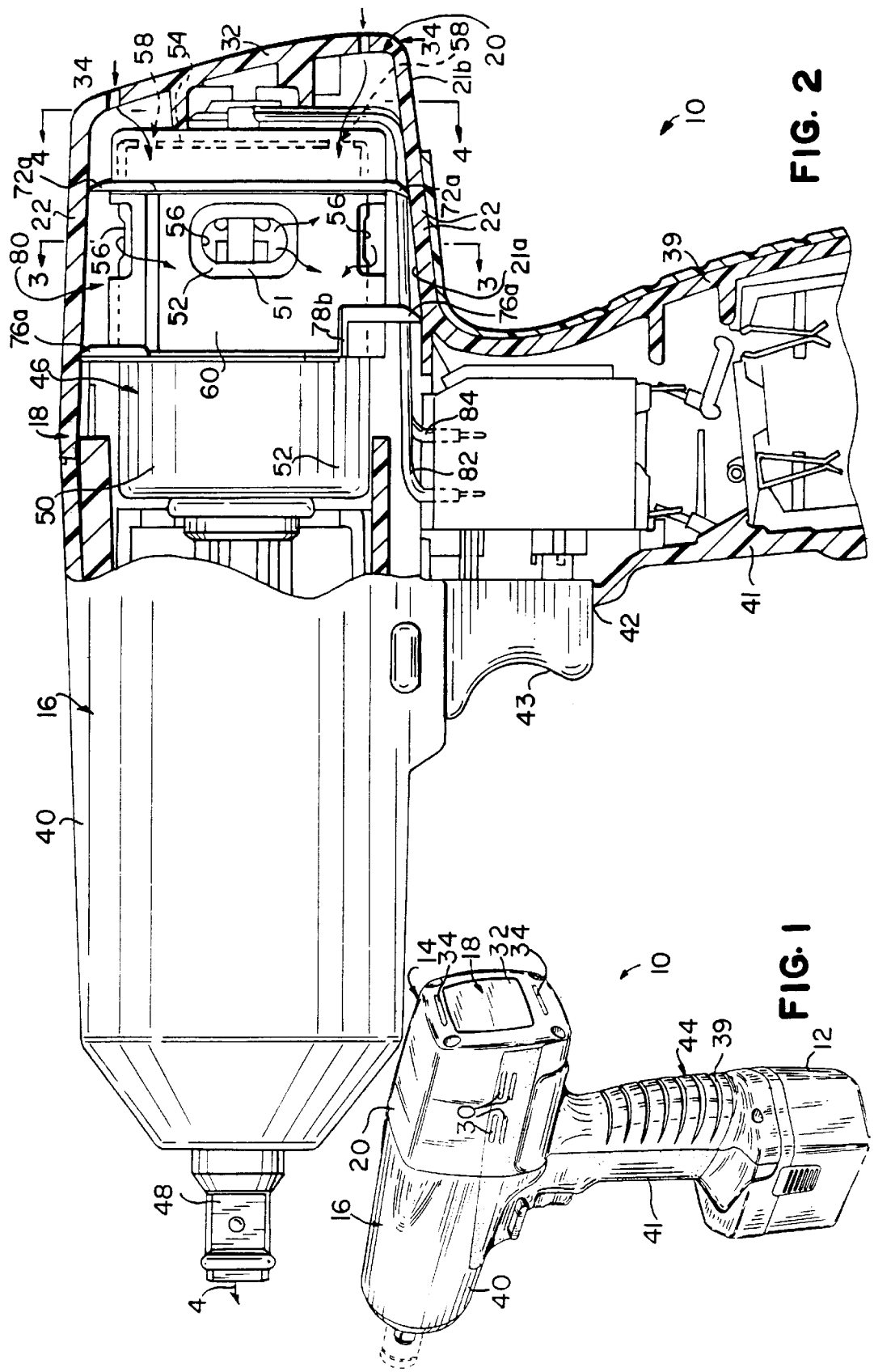

POWER TOOL WITH AIR DEFLECTOR FOR VENTING MOTOR EXHAUST AIR

BACKGROUND OF THE INVENTION

1. Field of the Invention

The present invention relates to power tools, and more particularly, to power tools with structure for venting the motor exhaust air thereof.

2. Description of the Prior Art

In the past, electric motors disposed in the tool housing of electric power tools have included air inlet ports to suck air into the motor for cooling and air exhaust ports to exhaust this air which has become warmed. Typically, the tool housing has vents aligned with the exhaust ports to vent the air from the tool to the atmosphere. Unfortunately, in prior tools, not all the air from the tool vents to the atmosphere, but instead some flows to other portions of the tool, such as the trigger and handle, which increases their temperature making them uncomfortable to handle and decreasing the life of the trigger switch. Also, some of the non-vented air may be re-sucked into the motor air inlet port, making the brushes of the motor hotter and decreasing their life.

One attempt to solve the problem was to integrally form an air deflector on an interior portion of the tool housing surrounding the motor exhaust air ports. The deflector consisted of two inwardly projecting walls which surrounded both the motor exhaust ports and vents in the tool housing in an attempt to channel the exhaust air mainly out of the tool housing vents and away from other areas of the tool. Since the deflector was formed integrally with the housing it needed to be formed of a hard plastic and, therefore could not fit tightly around the outer surface of the motor housing, permitting leakage to other areas of the tool. Additionally, if the deflector became damaged, the entire tool housing would need to be replaced.

SUMMARY OF THE INVENTION

It is a general object of the invention to provide an electric power tool which avoids the disadvantages of prior power tools while affording additional structural and operating advantages.

An important feature of the invention is the provision of a power tool which more efficiently channels the warm motor exhaust air directly out of the tool and away from other portions of the tool.

In connection with the foregoing feature, another feature of the invention is the provision of a power tool of the type set forth, which extends the life of the various tool components and prevents the tool from becoming uncomfortably warm to a user.

Another feature of the invention is the provision of a tool of the type set forth which includes a discrete, easily replaceable air deflector.

Certain ones of these and other features of the invention may be attained by providing a power tool including a tool housing having interior and exterior surfaces and inlet and outlet air vents and a motor disposed in the tool housing and having a motor housing with an external surface and inlet air ports for the passage of cooling air into the motor and outlet air ports for passage of warmed exhaust air from the motor. The inlet and outlet air ports open at the external surface, the outlet air ports being spaced from the inlet air ports. The tool also includes an air deflector resiliently coupled to the external surface. The air deflector includes a first wall structure disposed between the inlet air ports and the outlet air ports. The first wall structure has portions extending to and contacting the interior surface of the tool housing to form a barrier between the inlet and outlet air ports to substantially prevent exhaust air from the outlet air ports from entering the inlet air ports.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a rear perspective view of a battery-operated impact wrench in accordance with the present invention;

FIG. 2 is a fragmentary, side elevational view, partially in section, of the wrench of FIG. 1 illustrating the motor and the air deflector of the present invention;

DETAILED DESCRIPTION OF THE PREFERRED EMBODIMENT

Figure 3:
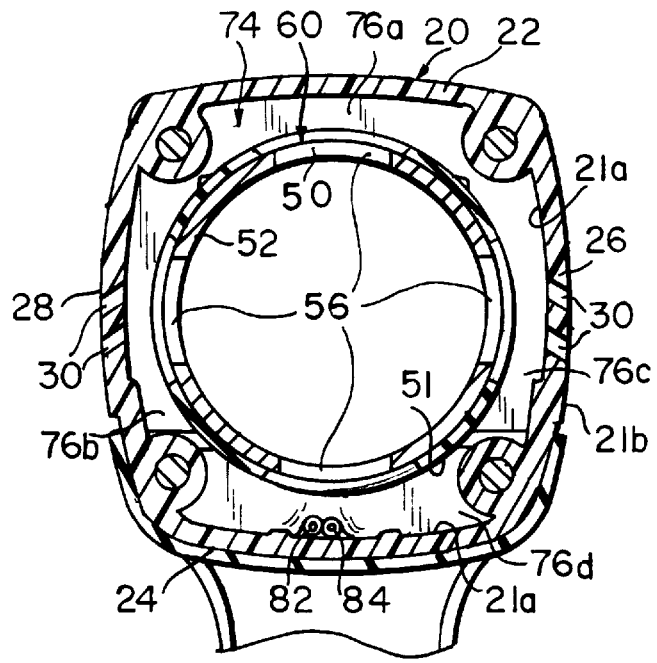
FIG. 3 is a sectional view taken generally along line 3—3 of FIG. 2 and not including the portions of the motor within the motor housing.

Referring to FIG. 1, a power tool in the form of a battery-operated impact wrench 10 is illustrated. The impact wrench 10 includes a battery pack 12 and a two-piece tool housing 14 formed of a hard plastic and having a front housing part 16 and a rear housing part 18.

Figure 4:
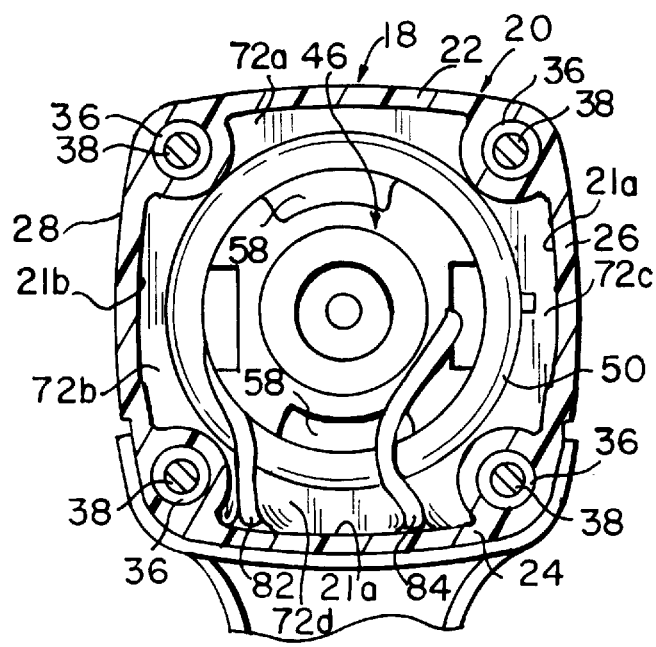
FIG. 4 is a sectional view taken generally along line 4—4 of FIG. 2.
Figure 5:
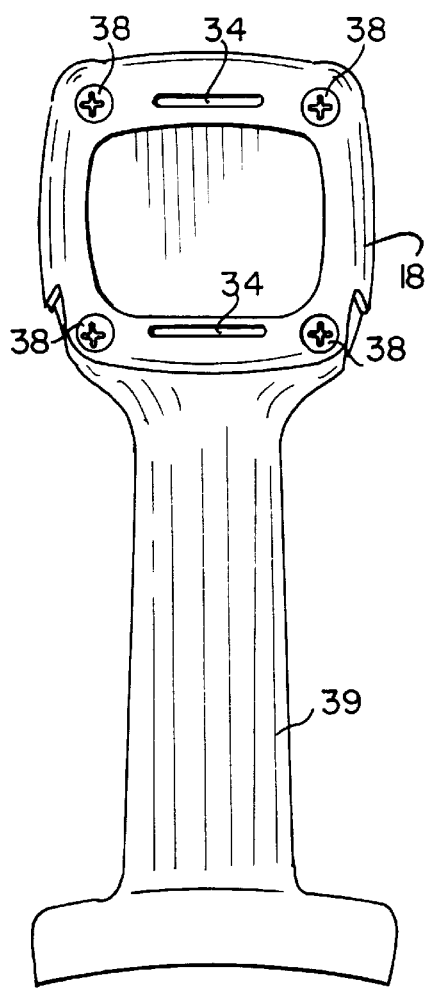
FIG. 5 is a rear elevational view of the rear housing portion of the wrench of FIG. 1.
Figure 6:
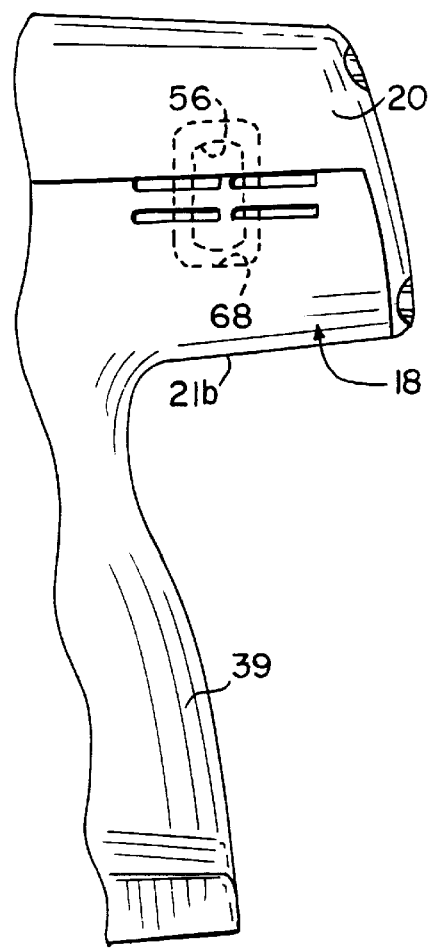
FIG. 6 is a side elevational view of the housing portion of FIG. 5.
Figure 7:
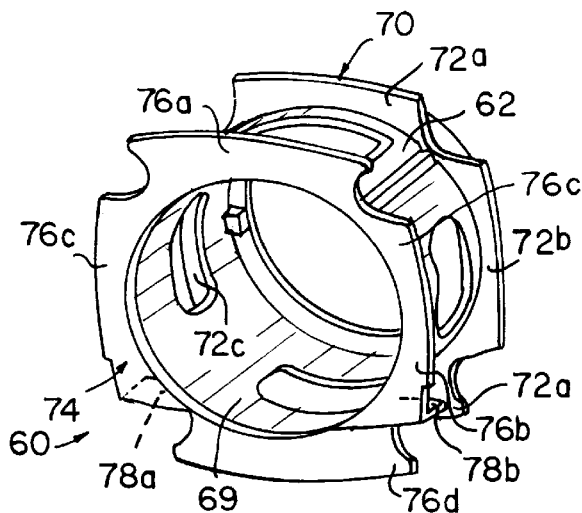
FIG. 7 is a front perspective view of the air deflector of the present invention.
Figure 8:
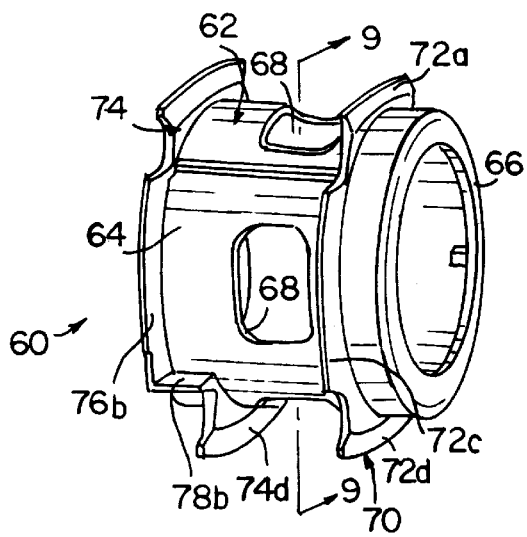
FIG. 8 is a side perspective view of the air deflector of FIG. 7.
Figure 9:
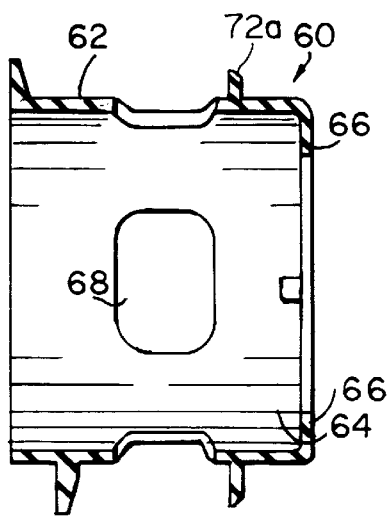
FIG. 9 is a sectional view taken generally along line 9—9 of FIG. 8.
Figure 10:
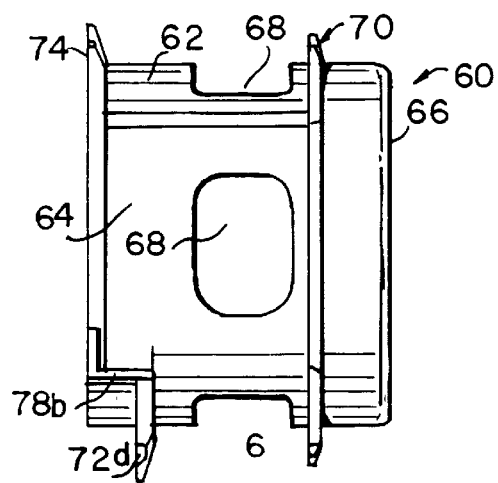
FIG. 10 is a side elevational view of the air deflector of FIG. 7.

As seen in FIGS. 2–4, the rear housing part 18 has a hollow box-like upper portion 20 having interior and exterior surfaces 21a, 21b. The box-like upper portion 20 is formed by top and bottom walls 22, 24, generally parallel sidewalls 26, 28 each having a plurality of outlet air vents 30, and a rear wall 32 connecting the walls 22–28 and having inlet air vents 34. The rear housing part 18 also includes four bolt shafts 36 for the passage of four bolts 38 for connecting the rear housing part 18 to the front housing part 16. The rear housing part 18 also has a lower handle portion 39.

As seen in FIG. 2, the front housing part 16 includes a generally bullet shaped upper portion 40 for housing internal impact wrench structure (not shown) coupled to the motor and a lower handle portion 41 including a trigger opening 42 to allow a trigger button 42, to be operated in a known manner. The lower handle portions 41, 39 of the front and rear housing halves 16, 18 together form a handle 44 (FIG. 1).

Disposed within the tool housing 14 is an electric motor 46 for powering and rotating an output shaft 48. The tool has a longitudinal axis A which is the axis of the shaft. The motor 46 includes a substantially cylindrical motor housing 50, having a cylindrical sidewall 52 with an external surface 51, and an end wall 54 (FIG. 4). The sidewall 52 has four equally spaced outlet exhaust air ports 56 opening at the external surface 51. As seen in FIG. 3, two diametrically opposed exhaust air ports 56 are aligned with outlet air vents 30. As seen in FIG. 2, the end wall 54 of the motor housing 50 faces the rear wall 32 of the rear housing part 18 and has two inlet air ports 58 (FIGS. 2 and 4) fluidly aligned with the inlet air vents 34 of the rear housing part 18. When the motor 46 is being operated, a fan in the motor 46 (not shown) sucks cooling air into the motor housing from the environment through inlet air vents 34 and inlet air ports 58 for cooling the motor 46, in a known manner, and exhausts the now warmed air through the four outlet air ports 56.

Disposed about a portion of the sidewall 52 and end wall 54 of the motor housing 50 is an air deflector 60. The air deflector 60 is flexible and resilient and formed of a thermoplastic material, such as one made by Advanced Elastomer Systems under the tradename Santoprene.

As seen in FIGS. 7–10, the air deflector 60 has a body 62 including a cylindrical sidewall 64 and an annular end flange 66 integral therewith. The body 62 also includes four equally spaced apertures 68 about its circumference. As seen in FIGS. 2 and 3, the apertures are respectively disposed about outlet air ports 56 of the motor housing 50.

The air deflector 60 also has a rear wall system 70 including four rear walls 72*a–d* which, as seen in FIG. 7–10, project outwardly from the cylindrical sidewall 64 and lie in substantially the same plane when not assembled on the motor housing 50. Four arcuate recesses separate adjacent walls 72*a–d*. As seen in FIGS. 2 and 4, rear walls 72*a–d* are disposed between the inlet and exhaust air ports 58 and 56 of the motor housing 50. As seen in FIG. 4, portions of the rear walls 72*a–d* extend to the interior surface 21*a* of the rear housing part 18 with the arcuate recesses respectively surrounding the bolt shafts 36. As discussed further below, the rear wall system 70 and the interior surface 21*a* form a barrier between the inlet air ports 58 and the exhaust air ports 56 to substantially prevent warm exhaust air exiting the exhaust air ports 56 from reentering the inlet air ports 58.

The air deflector 60 also includes a front wall system 74 including three front walls 76*a–c* substantially disposed in the same plane when not installed, as seen in FIGS. 7–10, and a fourth front wall 76*d* disposed in a plane axially rearwardly of front walls 76*a–c*. The front wall system 74 also includes two connecting walls 78*a,b* substantially perpendicular to front walls 76*a–d* and respectively extending between walls 76*c* and 76*d*, and walls 76*b* and 76*d*. The front wall system 74 also includes arcuate recesses for accommodating the bolt shafts 36. As seen in FIG. 2, the front wall system 74 is disposed axially in front of the exhaust air ports 56 of the motor housing 50. As seen in FIGS. 2 and 3, portions of the front walls 76*a–d* and connecting wall 78*a,b* of the front wall system 74 extend to and contact the interior surface 21*a* and together form a barrier that substantially prevents exhaust air from the exhaust air ports 56 from moving axially forward to other portions of the impact wrench 10, such as the handle 44 or trigger button 42.

As seen in FIG. 2, the front wall system 74, rear wall system 70, the interior surface 21*a* and the external surface 51 of the motor housing 50 form an exhaust air chamber 80, which allows the majority of the exhaust air passing from the exhaust air ports 56 to exit the outlet air vents 30 of the rear housing part 18 and which substantially prevents the exhaust air from going to portions of the tool other than the exhaust air chamber 80.

Additionally, though the ends of walls 76*a–d*, 78*a–b* of the front wall system 74 and the walls 72*a–d* of the rear wall system 70 are illustrated as nearly making complete contact with the interior surface 21*a*, there may be slight gaps between the ends of the walls 76*a–d*, 78*a–b* and 72*a–d* and the interior surface 21*a* without much consequence. This is because the exhaust air exiting the exhaust air ports 56 will seek a path of least resistance and will preferably exit the chamber 80 through the outlet air vents 30 rather than through gaps between the walls 72*a–d*, 76*a–d*, 78*a–b* and the interior surface 21*a*.

Additionally, as seen in FIGS. 3 and 4, since the air deflector 60 is formed of flexible and resilient material, it will deform around wires 82, 84 connecting the trigger button 42 to the motor 46 so as not to damage them and to attempt to form a seal against and around them.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A power tool comprising;
   a tool housing having interior and exterior surfaces and inlet and outlet air vents;
   a motor disposed in the tool housing and including a motor housing having an external surface and inlet air ports for the passage of cooling air into the motor and outlet air ports for passage of warmed exhaust air from the motor, the inlet and outlet air ports opening at the external surface, the outlet air ports spaced from the inlet air ports; and
   an air deflector resiliently coupled to the external surface and having a first wall structure disposed between the inlet air ports and the outlet air ports, the first wall structure having portions extending to and contacting the interior surface of the tool housing to form a barrier between the inlet and outlet air ports to substantially prevent exhaust air from the outlet air ports from entering the inlet air ports.

2. The tool of claim 1, wherein the deflector includes a second wall structure spaced from the first wall structure and extending to and contacting the interior surface of the tool housing to form a second barrier to substantially prevent exhaust air from passing therethrough to other portions of the tool, wherein the outlet air ports and the outlet air vents are disposed between the first and second wall structures.

3. The tool of claim 2, wherein the first and second wall structures are flexible and resilient to conform to the interior surface of the housing.

4. The tool of claim 3, wherein the deflector is formed of an elastomeric material.

5. The tool of claim 4, wherein the deflector includes a body connecting the first and second wall structures and resiliently disposed about the motor housing.

6. The tool of claim 5, wherein the body includes apertures respectively aligned with the outlet air ports.

7. The tool of claim 6, wherein the motor housing has substantially cylindrical housing sidewall and the body includes a substantially cylindrical body sidewall disposed about the housing sidewall.

8. The tool of claim 7, wherein the motor housing has an endwall disposed at an end of the cylindrical housing sidewall and the body has an annular flange connected to the body sidewall and disposed about the peripheral edge of the motor housing endwall.

9. The tool of claim 3, wherein the external surface of the motor housing, the first and second wall structures and a portion of the tool housing including the outlet air vents cooperate to form a chamber which vents exhaust air to the environment through the outlet air vents.

10. The tool of claim 1, wherein the motor is an electric motor.

11. A power tool comprising;
   a tool housing having interior and exterior surfaces and inlet and outlet air vents;
   a motor disposed in the tool housing and including a motor housing having an external surface and inlet air ports for the passage of cooling air into the motor and outlet air ports for passage of warmed exhaust air from the motor, the inlet and outlet air ports opening at the external surface, the outlet air ports spaced from the inlet air ports; and
   an air deflector resiliently coupled to the external surface and having a first wall structure disposed between the inlet air ports and the outlet air ports, the first wall structure having portions extending outwardly from the external surface of the motor housing toward the interior surface of the tool housing to form a barrier between the inlet and outlet air ports to substantially prevent exhaust air from the outlet air ports from entering the inlet air ports.

12. The tool of claim 11, wherein the deflector includes a second wall structure spaced from the first wall structure and extending up from the external surface of the motor housing toward the interior surface of the tool housing to form a second barrier to substantially prevent exhaust air from passing therethrough to other portions of the tool, wherein the outlet air ports and the outlet air vents are disposed between the first and second wall structures.

13. The tool of claim 12, wherein the first and second wall structures are flexible and resilient to conform to and around the interior surface of the housing.

14. The tool of claim 13, wherein the deflector is formed of an elastomeric material.

15. The tool of claim 14, wherein the deflector includes a body connecting the first and second wall structures and resiliently disposed about the motor housing.

16. The tool of claim 15, wherein the body includes apertures respectively aligned with the outlet air ports.

17. The tool of claim 16, wherein the motor housing has substantially cylindrical housing sidewall and the body includes a substantially cylindrical body sidewall disposed about the housing sidewall.

18. The tool of claim 17, wherein the motor housing has an endwall disposed at an end of the cylindrical housing sidewall and the body has an annular flange connected to the body sidewall and disposed about the peripheral edge of the motor housing endwall.

19. The tool of claim 13, wherein the external surface of the motor housing, the first and second wall structures and a portion of the tool housing including the outlet air vents cooperate to form a chamber which vents exhaust air to the environment through the outlet air vents.

20. The tool of claim 11, wherein the motor is an electric motor.

* * * * *